United States Patent
Matey et al.

(10) Patent No.: US 7,751,598 B2
(45) Date of Patent: Jul. 6, 2010

(54) METHODS AND SYSTEMS FOR BIOMETRIC IDENTIFICATION

(75) Inventors: James R. Matey, Levittown, PA (US); James R. Bergen, Hopewell, NJ (US)

(73) Assignee: Sarnoff Corporation, Princeton, NJ (US)

(*) Notice: Subject to any disclaimer, the term of this patent is extended or adjusted under 35 U.S.C. 154(b) by 113 days.

(21) Appl. No.: 11/510,197

(22) Filed: Aug. 25, 2006

(65) Prior Publication Data

US 2007/0047772 A1   Mar. 1, 2007

Related U.S. Application Data

(60) Provisional application No. 60/711,105, filed on Aug. 25, 2005, provisional application No. 60/711,106, filed on Aug. 25, 2005, provisional application No. 60/711,107, filed on Aug. 25, 2005.

(51) Int. Cl.
*G06K 9/00* (2006.01)
(52) U.S. Cl. ..................................................... 382/117
(58) Field of Classification Search .................. 382/117
See application file for complete search history.

(56) References Cited

U.S. PATENT DOCUMENTS 5,291,560 A * 3/1994 Daugman .................... 382/117
6,081,607 A * 6/2000 Mori et al. ................... 382/110
2004/0037452 A1 * 2/2004 Shin ............................ 382/117
2005/0084179 A1 * 4/2005 Hanna et al. ................. 382/294

OTHER PUBLICATIONS

"Analysis of Partial Iris Recognition Using a 1-D Approach", Du, Yingzi et al., IEEE International Conference on Acoustics, Speech, and Signal Processing, 2005. Proceedings, (ICASSP '05). vol. 2, Mar. 18-23, 2005 pp. 961-964.*
Arfken, G., "Mathematical Methods for Physicists," Academic Press, NY 6th Ed. (2005).
Atos Origin, "UK Passport Service, Biometrics Enrollment Trial." Atos Origin Report (May 2005).
Braithwaite, Michael et al., "Application-Specific Biometric Templates," AutoID 2002 Workshop, Tarrytown, NY, pp. 1-10 (2002).

(Continued)

*Primary Examiner*—Wenpeng Chen
(74) *Attorney, Agent, or Firm*—Lowenstein Sandler PC

(57) ABSTRACT

A method for identifying an iris image can include obtaining an iris image of an eye, segmenting the iris image, generating, from the segmented iris image, a normalized iris image, and generating, from the normalized iris image, an iris template. The method can also include generating a modified iris template by extracting a portion of the iris template, comparing the modified iris template with a plurality of previously stored other modified iris templates and matching the modified iris template with one of the plurality of previously stored other modified iris templates. The method can also include generating a modified iris template by extracting a portion of the iris template, comparing the modified iris template with a plurality of previously stored other modified iris templates, and matching the modified iris template with one of the plurality of previously stored other modified iris templates.

3 Claims, 4 Drawing Sheets

OTHER PUBLICATIONS

Daugman John, "How Iris Recognition Works," IEEE Transactions on Circuits and Systems for Video Teohnology, vol. 14, No. 1 (Jan. 2004).

International Biometrics Group, "Independent Testing of Iris Recognition Technology, Final Report," Study Commissioned by the US Department of Homeland Security (May 2005).

Daugman, John et al., "Iris recognition border-crossing system in the UAE," International Airport Review, Issue 2 (2004).

Mansfield, Tony et al., "Biometric Product Testing Final Report," CESG Contract X92A/4009309, CESG/BWG Biometric Test Programme; Centre for Mathematics & Scientific Computing, National Physical Laboratory (2001).

* cited by examiner

METHODS AND SYSTEMS FOR BIOMETRIC IDENTIFICATION

CROSS-REFERENCE TO RELATED APPLICATIONS

This application claims the benefit of U.S. Provisional Application No. 60/711,105, filed Aug. 25, 2005, U.S. Provisional Application No. 60/711,106, filed Aug. 25, 2005, and U.S. Provisional Application No. 60/711,107, filed Aug. 25, 2005. The entire disclosures of U.S. Provisional Application Ser. Nos. 60/711,105, 60/711,106, and 60/711,107 are incorporated by reference herein.

FIELD OF THE INVENTION

Embodiments of the present invention generally relate to biometric identification systems and in particular to biometric identification systems using iris recognition methods.

BACKGROUND OF THE INVENTION

Iris recognition is one of the most powerful techniques for biometric identification ever developed. Commercial systems, like those based on an algorithm developed by Daugman, (see U.S. Pat. No. 5,291,560, the contents of which are hereby incorporated by reference herein) have been available since 1995 and have been used in a variety of practical applications.

The basic principles of iris recognition are summarized in FIG. 1. The subject iris 10 is illuminated with light from controlled and ambient light sources 12. The camera 14 and the controlled illumination 16 are at some defined standoff distance 18, 20, from the subject. The camera and lens 14 (possibly filtered) acquires an image that is then captured by a computer 22. The iris image 24 is then segmented, normalized and an iris template (commonly called an iris code) 28 is generated. Segmentation identifies the boundaries of the pupil and iris. Normalization remaps the iris region between the pupil and the sclera (the white of the eye) into a form convenient for template generation and removes the effects of pupil dilation using a suitable model. The template is then matched against an existing database 30 of previously enrolled irises; a match against the database indicates the current iris is the same iris used to create the template in the database.

However, prior iris recognition techniques suffer from several difficulties for some applications. One difficulty is that when used in systems with large (e.g., 500,000) people in the database, such systems require a large number of servers to accommodate the large number of people in the databases.

Another difficulty is that prior techniques have been designed and optimized for applications in which the false match rate is of paramount importance-neglecting applications in which other factors are more important than the false match rate or in which other engineering tradeoffs should be considered. In addition, these techniques expect a reasonably high quality image. There are applications where one would accept a higher false match rate in return for the ability to use lower quality images. Forensic applications are one example. Acquisition of images for iris recognition in less constrained environments is another example.

Acquisition of high quality iris images is difficult because the human iris is a small target (~1 cm diameter), with relatively low albedo (~0.15), in the near IR. Existing iris recognition algorithms recommend a resolution of the order of 200 pixels across the iris. Hence, acquisition of iris images of sufficient quality for iris recognition is challenging, particularly from a distance. Current commercially available iris cameras require substantial cooperation on the part of the subject. Two simple metrics for the required degree of cooperation are the capture volume and the residence time in the capture volume. The capture volume is the three dimensional volume into which an eye must be placed and held for some period of time (the residence time) in order for the system to reliably capture an iris image of sufficient quality for iris recognition. For ease of use, the user would want the spatial extent of the capture volume to be as large as possible and the residence time to be as small as possible.

A related issue is the standoff distance, the distance between the subject and the iris image acquisition system. Existing systems require reasonably close proximity, in some cases an 'in your face' proximity. Existing iris recognition algorithms are generally good enough for most applications in which the subject is sufficiently cooperative. A challenge resides in reducing constraints on the subject so iris recognition is easier to use.

In scenarios in which iris recognition needs to be deployed in less constrained environments, we can reasonably expect that the acquired iris images will be of lower quality than those in highly constrained environments. Hence, there is a need for algorithms that can work with lower quality images, even at the possible expense of higher false match and/or false non-match rates.

Current iris recognition algorithms search a template database by brute force. The algorithms used are very efficient, but they conduct the search by systematically testing against every template in the database until a match is found. For large databases that are subject to high interrogation rates this consumes many CPU cycles and requires deployment of large collections of computers to provide acceptable response rates. Thus, there is a need for a method that can improve the search rate over existing algorithms and one that will decrease the equipment costs for the database searches. This will become particularly important as high throughput iris recognition systems become widely deployed.

Thus, there are multiple reasons that we need improvements to existing iris recognition methods, including alternatives to the existing methods.

SUMMARY OF THE INVENTION

Embodiments of the present invention address these and other needs and generally relate to method for improving the acquisition of iris images, improving methods of generating iris templates and for improving methods for searching template databases.

Embodiments of the present invention generally relate to methods for improving performance of an iris recognition system. The methods can include using iris image registration and averaging steps to improve performance. In one embodiment, the iris image is averaged. In another embodiment, the segmented iris image is averaged. In yet another embodiment, the normalized iris image is averaged. In another embodiment, the biometric template is averaged. As used herein, the term 'averaged' denotes a combining of two or more entities, such as iris templates, based on a set of rules based on information that can be contained both within and external to the entity, or iris template. The term average, as used herein, is not restricted to the narrower concept of an arithmetic mean. The purpose of the averaging is to create an entity which is better than any one of the individual entities that have been averaged.

Embodiments of the present invention include methods for iris recognition in which false match rates are balanced against other performance parameters.

In one embodiment, there is provided an iris recognition method for capturing iris images that provide increased capture volume, decreased acquisition time, increased standoff and the capability of acquisition of iris images from moving subjects.

Embodiments of a method for identifying an iris image can include obtaining an iris image of an eye, segmenting the iris image, generating, from the segmented iris image, a normalized iris image, and generating, from the normalized iris image, an iris template. The method can also include generating a modified iris template by extracting a portion of the iris template, comparing the modified iris template with a plurality of previously stored other modified iris templates and matching the modified iris template with one of the plurality of previously stored other modified iris templates.

BRIEF DESCRIPTION OF THE DRAWINGS

Embodiments of the present invention will be more readily understood from the detailed description of exemplary embodiments presented below considered in conjunction with the attached drawings, of which.

It is to be understood that the attached drawings are for purposes of illustrating the concepts of the invention and may not be to scale.

DETAILED DESCRIPTION OF THE INVENTION

Figure 1:
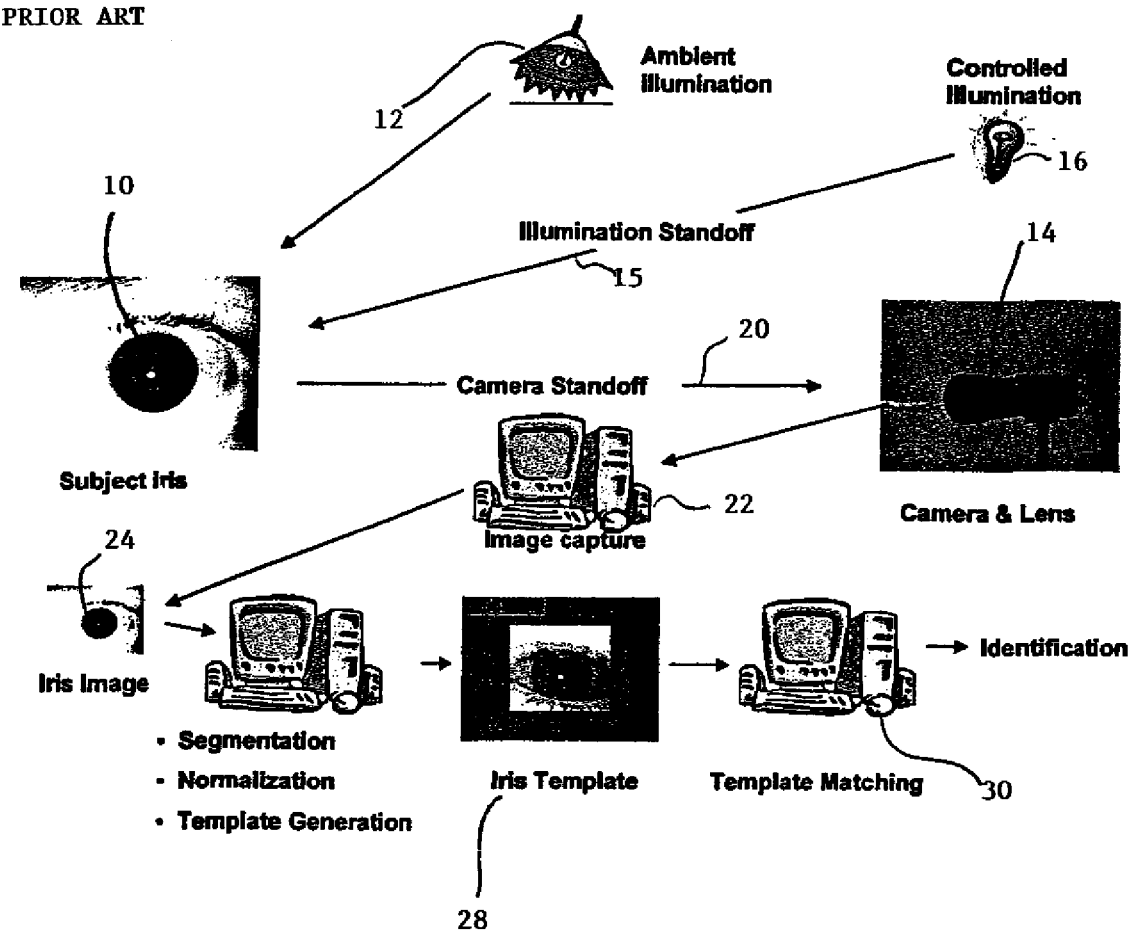
FIG. 1 is a schematic of an iris recognition system.

As described above with reference to FIG. 1, a captured iris image is then segmented, normalized and an iris template (commonly called an iris code) is generated. The template is then matched against an existing database of previously enrolled irises; a match against the database indicates the current iris is the same iris used to create the template that is in the database.

Figures 2A, 2B:
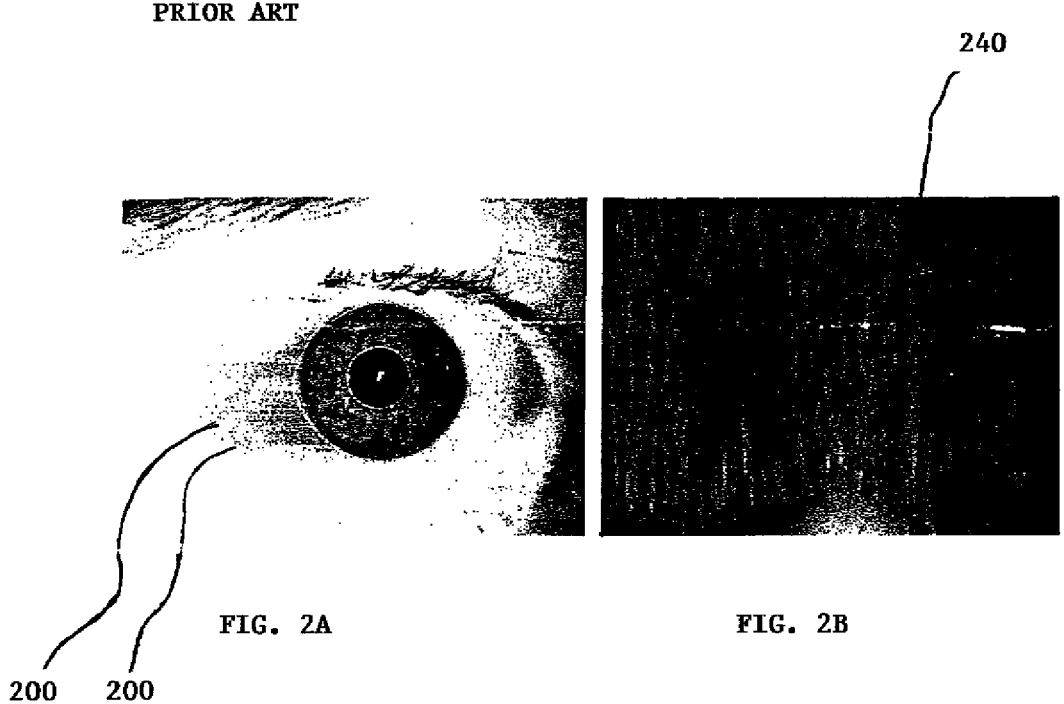
FIG. 2A depicts an iris image with segmentation indicated.
FIG. 2B depicts an iris image that has been normalized.

Segmentation identifies the boundaries of the pupil and iris. Normalization remaps the iris region between the pupil and the sclera (the white of the eye) using a transform that removes the pupil size variation. FIGS. 2A and 2B are an example of a polar transformation described in U.S. Pat. No. 5,291,560 (issued to Daugman), as is known to those of skill in the art.

FIG. 2A depicts an iris image with segmentation 200 indicated. FIG. 2B depicts a normalized image. For this example, the normalized image has increasing radius 240 from top to bottom and increasing angle from left to right, as is known to those of skill in the art. The horizontal streaks on the segmented image are an artifact of the specularity reduction algorithm used for this example.

An example of an iris code generated by performing a dot product between complex Gabor wavelets and the normalized image is herein described. The phase angles of resulting complex dot products are then quantized to 2 bits and assembled into a bit array that comprises (with possibly additional information) an iris template.

Figure 4:
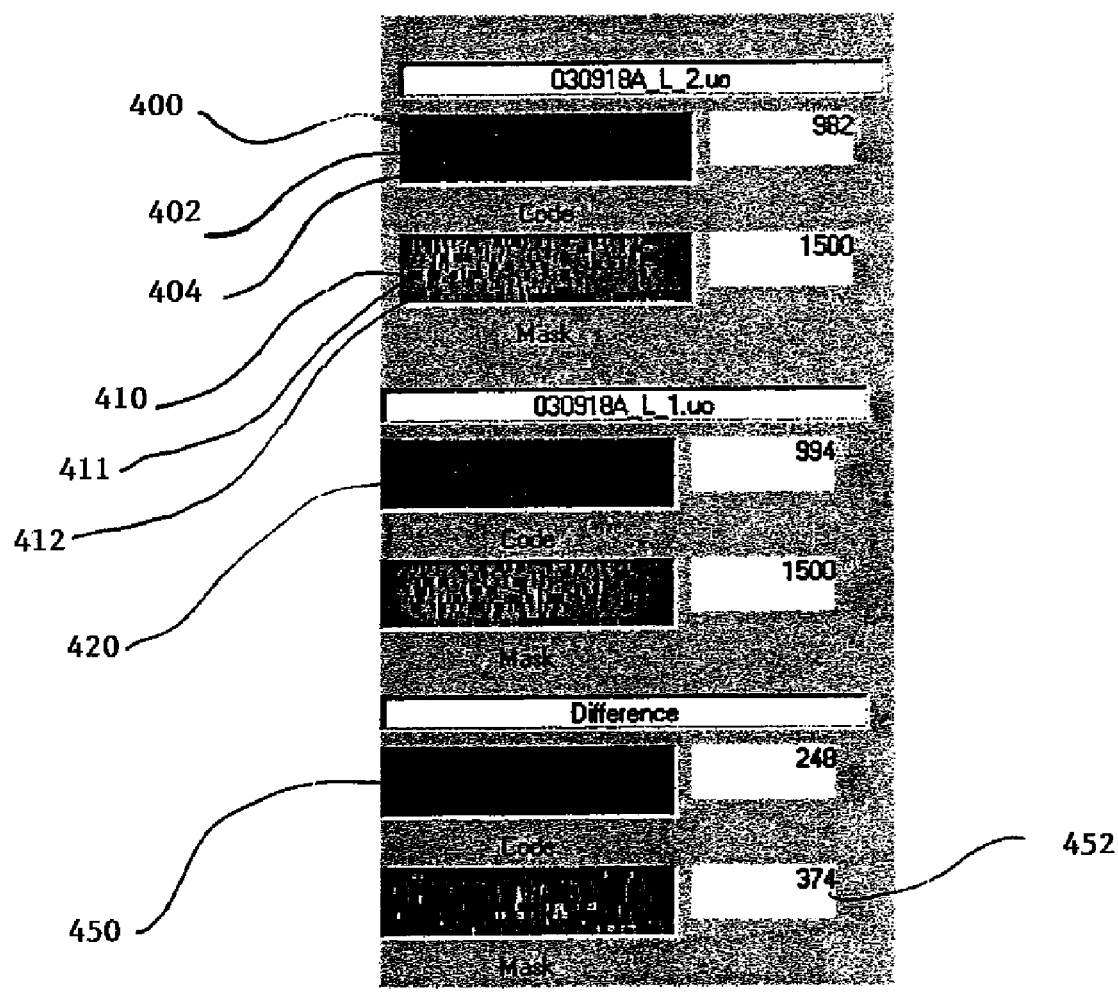
FIG. 4 is a graphical display of two iris codes from the same eye and the difference between them.

With reference to FIG. 4, iris template 400 contains a bit pattern of light and dark bits 402, 404 that indicate the presence and location of iris contours. The mask 410 also contains a light and dark bit pattern 411, 412 indicating locations in the template 400 of relative high and low confidence of accuracy, as is known to those of skill in the art.

The comparison step computes the Hamming distance between the bit array of one template and that of another and compares that distance to a pre-determined threshold. The Hamming distance is the number of bits that differ between the two bit arrays. The fractional Hamming distance is the fraction of the bits that differ between the two templates. The term "Hamming distance" is conventionally used in this context to denote the fractional Hamming distance—and this convention is adopted for the purposes of this description. It has been has shown that Hamming distances less than 0.33 are statistically unlikely for templates that arise from different irises. Some matching algorithms adjust the raw Hamming distance based upon the number of bits available in the templates and the size of the enrolled database to produce a modified Hamming distance, as is known to those of skill in the art.

In accordance with embodiments of the present invention, there are provided alternative methods for iris template generation, for template comparison and methods for modification of conventional iris templates that enable improvements in the performance of iris recognition systems. The alternative and modified templates and comparison methods can be useful in the construction of reference databases and in preparation of templates to be compared with the reference database.

In accordance with embodiments of the present invention, there is provided a method for using a lower reliability method to search the iris template database for likely matches that can be subsequently confirmed with a higher reliability method, such as, for example, a method practiced by Daugman. If the lower reliability method generates false matches at a rate PFM the computation cost of the new proposed method is:

$$CC_{new} = P_{FM} NO_H + NO_L = N(P_{FM} O_H + O_L)$$

where $O_H$ is the computational cost for a single comparison of the high reliability method and $O_L$ is the computational cost for a single comparison of the low reliability method. —The computational cost using only the high reliability method is simply:

$$CC_H = NO_H$$

Hence the ratio of the costs is expressed as:

$$CC_{new}/CC_H = (P_{FM} O_H + O_L)/O_H = P_{FM} + O_L/O_H$$

Clearly, if $O_L \ll O_H$ and $P_{FM} \ll 1$, the computational cost of the new method can be much smaller than applying the high reliability method alone.

Several embodiments of lower reliability methods involve extraction of a Modified Iris Template that contains a subset of the information contained in the original iris template. Matching this modified iris template against a correspondingly modified stored iris template will yield a partial measure of similarity that can provide lower reliability identity information. Exemplary embodiments of such partial template methods that could be used with templates of the form used in Daugman-like methods include, but are not limited to: 1) row extraction and 2) column extraction. Another embodiment of lower reliability match methods involves an indexing process. In this embodiment an indexible iris template with reduced degrees of freedom is extracted using error correcting code techniques.

Another embodiment of lower reliability match methods involves binning iris templates based on a similarity measure or characteristic metric that allows grouping templates of similar structure (i.e., binning methods).

Row Extraction

According to an embodiment of the present invention, a new template consisting of the data from a single row of the conventional template is constructed. If the template has N rows, comparison of such modified templates will be less computationally expensive by a factor of 1/N. As an alternative to extracting a single row, the rows could be combined into a single row by a generalized averaging technique, for example, a plurality voting or super-majority voting technique.

One can estimate the probability of obtaining a false match using the low reliability method ($P_{FM}$) in the following way. As suggested by Daugman, model the matching process using a binomial distribution with p=q=0.5. It has been shown that the number of degrees of freedom in the iris is of the order of n=250. Approximate the binomial distribution of normalized Hamming distances (fraction of bits set) by a Gaussian of mean 0.5 and standard deviation $0.5/\sqrt{n}$. The nominal cutoff for recognition in existing systems is a Hamming distance of 0.3—which differs from the mean by 0.2. For n=250, the standard deviation, is ~0.032, so the difference is approximately 6 standard deviations. The probability of an event that is $6\sigma$ or larger is approximately $1:10^9$. If one reduces the effective n by reducing the number of bits that are analyzed, one can increase the probability of getting a match between two unrelated templates.

If the reduction is 8 fold, the standard deviation will be $\sigma=0.5/\sqrt{(250/8)}$ or about 0.09—and the cutoff is now $2.2\sigma$ from the mean. The probability of a $2.2\sigma$ or larger deviation from the mean is ~1.5%.

As such, the following expression may be derived:

$$CC_{new}=(0.125+0.015)CC_H=0.14CC_H$$

This is a factor of approximately 7 times faster than the conventional approach. According to an embodiment of the present invention, improved results are achieved by this method because the bits in the iris code are correlated along the vertical directions of the graphical display, corresponding to radial correlations. Hence, taking out a single row from a template of N rows captures more than 1/N of the degrees of freedom in the code.

The Gaussian approximation used here has larger tails than the binomial—this inflates the PFM estimate and thereby reduces the estimated improvement. According to this particular approach, the maximum improvement is a factor of eight. For example, a backend server of an iris recognition system requiring $1M worth of hardware using only the conventional high reliability method, may realize a cost reduction on the order of $125K using the method described above.

Column Extraction

In this embodiment, there can be provided a step to decimate columns, keeping a constant angular distance between the remaining columns so one can do the barrel shift described above. This embodiment of the method is less advantageous than the row extraction because it decreases the angular resolution of the barrel shift and does not make use of the correlation between code bits along the columns.

Index Methods

A typical iris template has of the order of 250 degrees of freedom. One can use some fraction of those degrees of freedom to generate an error corrected reduced iris template of fewer bits at enrollment and store the error corrected value as an index that can be used as a hash table lookup into the database of iris templates. The iris template generated during recognition will differ from the enrollment. However, if the error correction works—one can still recover the template index.

This embodiment may use the recovered index to pick the corresponding iris template from the database. With a sorted lookup table this is simply several memory access and compare operations. In the next step of this embodiment, the full iris templates are compared. When the index works, one saves a factor of approximately N (database size). If the index fails, the method falls back to any of the methods already described. If $P_{IF}$ is the probability that the index fails, the speedup of the index method is a factor $[(1/N+P_{IF}]$ over that of the fall back method alone.

Binning Methods

In accordance with an embodiment, the binning method generates a characteristic metric from the enrollment iris templates that can be used to partition the database of iris codes into R subsets that can be subsequently selected on the basis of the computation of the characteristic metric for an identification template. One can use any of a large variety of characteristics of the iris code.

As an example, in accordance with an embodiment of the present invention, one step could compute the energy spectrum of the enrollment iris templates and select the L largest peaks in the spectrum. Another step could assemble the peak locations into L tables that each share an index with the table of full iris template and sort the L tables.

In addition, this embodiment may include a step of comparing an identification template against the database, which allows the method to compute its peak locations and do full Hamming distance comparisons of the identification template against all the enrollment templates that have a peak in one of the L tables that is within some delta of the peaks of the identification template. The size of the delta and the range of the peaks location in this embodiment will define R—though the deltas could be non-uniform.

When the binning works, this embodiment of the method saves a factor of approximately R/L. If the binning fails, the steps could fall back to any of the methods already described.

In implementing one of these reduced size template approaches, in one embodiment, the system generates templates for the proposed search at the substantially the same time as the system generates the full templates and links them to the full templates in a database. The reduced size templates may take up less memory, memory use reduction can enable maintenance of the entire database in memory, reducing the need for disk paging, another speed improvement over and above the simple analysis above.

Embodiments of the present invention include methods for improving capture of iris images to provide increased capture volume, decreased acquisition time, increased standoff and the capability of acquisition of iris images from moving subjects. In one embodiment, multiple images are combined to generate a template that is improved as compared to a template obtained from any of the individual images. According to an embodiment of the present invention, this can be achieved by generalized averaging of the one or more of following items which are generated at various stages of the template generation process: 1) the iris image; 2) the segmented iris image; 3) the normalized iris image; and 4) the biometric template.

Figure 3A:
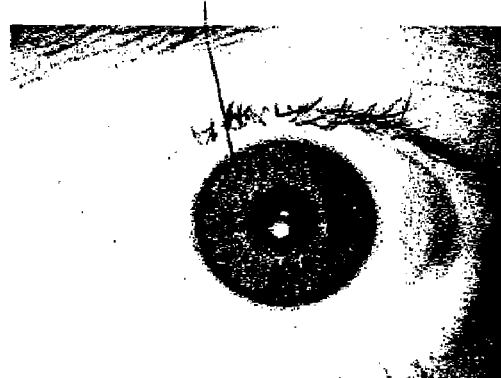
FIG. 3A depicts an original iris image.
Figure 3B:
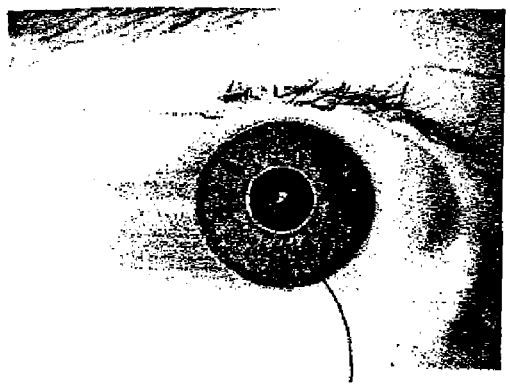
FIG. 3B depicts the iris image of FIG. 3A with segmentation indicated.
Figure 3C:
FIG. 3C depicts a normalized image of the iris image of FIG. 3B.

In addition, in one embodiment, information from the later stages of the template generation process is used to guide averaging at the earlier stages of the process. The stages are illustrated in FIGS. 3A-C. The mask bits in the template indicate those regions of the template—and the corresponding locations in the images—where the image was of sufficient quality to get good code bits.

FIG. 3A shows an original iris image 300. FIG. 3B is an iris image with segmentation indicated 310. The horizontal streaks on the segmented image are an artifact of the specularity reduction algorithm used for this example. FIG. 3C is a normalized image 320. For this example, the normalized image (FIG. 3C) has increasing radius from top to bottom and increasing angle from left to right.

Averaging Iris Templates

According to an embodiment of the present invention, methods are provided wherein two templates are compared by computing the Hamming distance between the code portions of the template as a function of barrel shift along the horizontal (angular) axis of the templates. Only the bits flagged as good in both masks are included in the comparison. The barrel shift takes into account angular rotation of the eye between the acquisitions of the images for the two templates. For example, a typical template includes 2048 code bits and an equal number of mask bits. As such, for good quality iris images approximately 1500 of the mask bits are set; hence, there are approximately 500 bits in the code sections that are flagged as not valid.

FIG. 4 illustrates a comparison 450 of the two codes. At the barrel shift that minimizes the Hamming distance, there are 374 bits (452) in the difference between the masks. Assuming the mask bits are an accurate representation of the quality of the code bits, one can improve the number of valid bits in a new template for this eye by performing the following steps: 1.) barrel shifting one of the templates to align with the other using Hamming distance as the criterion for best shift; 2) creating a new blank template with all mask bits and code bits turned off; 3.) for each location in the pair of original, aligning the templates and checking the mask bits.

If both mask bits are set, then check the code bits. If they agree/match, the corresponding code bit of the new template may be set to that value and the corresponding mask bit of the new template may be set. If the code bits do not agree, the corresponding mask bit of the new template may be cleared, since the value of the code bit is not known.

If neither mask bit is set, no action is taken, and the mask and code bits of the new template are cleared because no information for this code bit is known.

If one mask bit is set, the corresponding code bit from the template that has the mask bit set is selected and the corresponding bit of the new template is set to the value of the code bit in the template with the valid mask bit.

In accordance with another embodiment, if there are more than two templates, the system can 1.) align all of templates; and 2.) for each bit location, take a vote among all of the templates for which the mask bit of that location is set, and set the corresponding bit of the new template to the value determined by the outcome of the vote. Further, the mask bit of the new template is set. The vote criteria can be varied depending on applications. For some applications a simple plurality may be sufficient, for others a super-majority or some other more complex vote criteria may be optimal. If the vote is not decisive, for example the voting does not provide a required super majority for either bit state, the mask bit would be cleared to indicate that that bit is not reliable.

If, for some bit location, none of the templates has a corresponding mask bit set, the mask and code bits of the new template should be cleared.

In accordance with an embodiment, the templates are aligned to the template with the most valid bits. An optimization of the alignment procedures is also contemplated by the present invention. One possible optimization is to average the two best templates using the two template method described above, then to incrementally add in the other templates, one by one to the averaged template.

Averaging Initial Iris Images

One embodiment of the present invention relating to the averaging of initial iris images is to include proper alignment and scale. In the course of generating the iris templates, the centers and radii of the pupil and iris may be computed. In the course of a comparison of iris templates, information about the relative rotation of the iris is generated. In another embodiment having two images, this information can be used as follows:

1. From the radii computed for the two images, compute a scaling factor and scale the second image so its radii match those of the first;
2. From the centers information of the two images, compute x and y offsets and shift the images in x and y to match the centers;
3. From the barrel shift computed from the templates of the two images, compute a rotation and rotate the second image about the pupil center to align it with the first; and/or
4. Average the aligned images.

In an embodiment having more than two images, align them all to one image and average. In another embodiment, the user would want to pick the images with the most mask bits set as the alignment image. The averaged image can then be used to generate an enhanced template.

Averaging Segmented Iris Images

With access to the segmented iris images, in accordance with another embodiment, one can perform an initial alignment as described in the previous section and then employ correlation (or other) based image alignment techniques to refine the alignment between the two images—only utilizing portions of the image associated with the iris. The averaged image can then be used to generate an enhanced template.

Averaging Normalized Iris Images

With access to the normalized images, in accordance with another embodiment, one can use correlation (or other) based image alignment techniques to align the normalized image along the angular (horizontal) axis and then average the normalized images. With access to the normalized images, one can use the barrel shift information from the template comparison to align the normalized image along the angular (horizontal) axis and then average the normalized images. Alternatively, one can align the normalized images using the barrel shift information and then refine the alignment using correlation (or other) based image alignment techniques. Enhanced iris templates generated using this technique (including any of the exemplary embodiments) can be used in place of the standard iris templates, known in the art, both as templates to be identified and templates to be stored in a reference database.

The embodiment of using information from various stages of the process to assist in alignment and averaging at other stages of the process is an important aspect of embodiments of the present invention.

Image Transformation and Normalization

Analysis of an annular object such as a human iris can be facilitated by transformation of the image in rectangular coordinates to an image in polar coordinates as shown in FIGS. 2A and 2B. In one embodiment, there is provided a method for transforming images of the eye taken at near normal incidence using a rectangular to polar transformation.

In another embodiment, in situations in which a polar transformation is not the best model, a transformation into an alternative co-ordinate system may be used. The present invention contemplates biometric recognition for all beings having irises. Tracking the identity of livestock, zoo animals, pets and racing animals are potential applications of iris recognition. Some non-human species have eyes with irises or pupils that are non-circular. In these cases, a transformation into an alternative co-ordinate system may be preferable.

For example, the pupil of a cat is not circularly symmetric. The cat iris is more similar to a slit than a circular hole. Hence, an ellipse is a better model for the shape of the pupil than is a circle and a form of elliptical coordinates as described in "*Mathematical Methods for Physicists*," by G. Arfken, (Academic Press, NY), may be a better coordinate system. Depending on the details of the iris and pupil structure, other classic coordinate systems described in Arken and references cited therein may be useful. More complicated non-classic coordinate systems may also be useful. For example, we may use a physiological/mechanical model of pupil dilation to construct a specialized coordinate system in which the pupil dilation can be easily normalized. In some cases, we may model pupil dilation using elastic theory, in such cases, the Schwarz-Christoffel transformation and related transformations from complex variable theory may be used.

When an image of the eye is captured from an angle relative to the optic axis of the eye, the foreshortening effect changes the apparent shape of the iris—It is no longer circular. In this case, a transformation into an alternative co-ordinate system may be preferable. One embodiment includes a method for transformation from the rectangular co-ordinate system of the image to another rectangular co-ordinate system that takes into account the projection and a subsequent transformation to a coordinate system appropriate for the eye structure. After the coordinate transformation(s), a further step may include applying other transformations to the image.

For example, there may be a step to histogram equalize or gamma correct the image. The result of the coordinate transformation(s) and whatever other transformations applied is a normalized image ready for subsequent analysis. In an alternative embodiment, the method may include an evaluation of the original image or the normalized image to determine parts of the image not suitable for analysis for reasons such as specularities or occlusion.

Analysis of the Normalized Image

There are many embodiments of methods in accordance with the present invention for analysis of the transformed image. Here are a few examples: Direct Normalized Correlation of Normalized Images:

Normalized images can be directly compared by correlation analysis. Given two normalized images, A and B, subtract off their respective means and then compute the following formula:

$$C = A \cdot B / \sqrt{(A \cdot A * B \cdot B)}$$

as a function of barrel shift along the polar axis of the normalized image and select the maximum. In this formula, • indicates a dot product. The maximum C is the normalized correlation for the images and is a direct measure of similarity of the images. This process also determines the degree of rotation between the two images—it is simply the barrel shift at the maximum of C. This process can be reasonably fast because modern image processing boards often have specialized circuits to carry out this operation at high speed. For a normalized image N pixels high and M pixels wide, the computational cost is of the order of $NM^2$; note the polar nature of the co-ordinate system relieves difficulties at the horizontal edges of the image.

If meta-data are included for the image that indicates some pixels in the image are not suitable for analysis, those pixels can be excluded from the analysis. Pixels might be excluded because they are part of a specularity in the iris or an occlusion of the iris.

The direct correlation method is presented first because it is a prototype for the approaches that follow. In the direct correlation method, there is a comparison of images rather than some more compact representation of the images. Compact representations have advantages for speed of comparison and size of storage for the templates. The more compact representations are divided into phase like, amplitude like and other, with sub divisions of local and global.

Extraction of Phase Like Global Measures

In this embodiment, the B image in the direct correlation example is replaced with two images; one has sine like character, the other has cosine like character. Csine and Ccosine are computed as a function of barrel shift (excluding unsuitable pixels as discussed above). For each barrel shift, an angle σ is computed from the four quadrant arc-cosine: acos(Csine, Ccosine). Function σ (barrel shift) is generated and is periodic in barrel shift, that is representative of the image A, and which can be compared with σ's extracted from other normalized iris images to determine similarity of the normalized iris images.

Exemplary comparison methods suitable for use with present invention include, but are not limited to: 1) normalized correlation of the σ's; and 2) quantization of the σ's and comparison of the resulting bit streams via Hamming distance.

Extraction of Phase Like Local Measures

In this embodiment of the present invention, the B image is replaced in the direct correlation example with a collection of 2N images; composed of image pairs one has sine like character the other has cosine like character. Each of the N pairs is designed to interrogate a specified region of the A image. Each of the specified regions may be an arbitrary region or arbitrary collection of arbitrary sub-regions, Csine(i) and Ccosine(i) are computed for each of the N pairs; i is the location index (excluding unsuitable pixels as discussed above). For each pair; an angle σ i is computed from the four quadrant arc-cosine: acos(Csine, Ccosine). A function σ (i) is calculated that is representative of the image A, and which can be compared with σ (i)'s extracted from other normalized iris images to determine similarity of the normalized iris images. The number of pixels included for each "i" may be kept track of and locations that do not have sufficient support or fail some other criteria for quality are excluded.

Comparison may be more complicated than in the global measure case depending on the symmetry of the N pairs. If the N pairs are generated by successive barrel shifts of the first pair, the following exemplary processes may be used in accordance with the present invention: 1) normalized correlation of the σ's; and 2) quantization of the σ's and comparison of the resulting bit streams via Hamming distance with barrel shifts of the bit streams.

Examples of regions for the first pair of a set of N barrel shifted pairs which may be used in accordance with the present invention include, but are not limited to: 1) a single vertical (radial) region; 2) a group of isolated regions arranged vertically (radially); 3) a single diagonal (spiral) region; and 4) a group of isolated regions arranged diagonally (spirally).

Generation of regions with symmetries other than the barrel shift symmetry can provide other means for simplifying the comparison.

Extraction of Amplitude Like Local or Global Measures

In an alternative embodiment, the sine-like and cosine-like image pairs can be replaced in the analyses above with single images and process the iris images in the same way except use the correlation, C, rather than the acos(Csine, Ccosine).

Mixed Modes

In an alternative embodiment, these techniques can be combined in a variety of ways including, but not limited to: 1) using an amplitude or phase like local or global measure that is tuned for extraction of the barrel shift needed to align two normalized images to align a pair of normalized images and then perform a direct correlation analysis of the images; 2) using a low resolution, high false match rate local or global, amplitude or phase like measure to select candidates for direct correlation analysis of the normalized images; and/or 3) using a low resolution, high false match rate local or global, amplitude or phase like measure to select candidates and define the barrel shift for angular registration of the images. Amplitude or phase like local measures can then be computed at a collection of sites on any arbitrary matrix imposed on the registered normalized images.

One having ordinary skill in the art will appreciate that alternative alignment methods may also be included. For example, two normalized images can be aligned using FFT techniques—transform both images via FFT, take the product, normalize appropriately, transform back and then find the peak in the resulting cross correlation function.

It is to be understood that the exemplary embodiments are merely illustrative of the invention and that many variations of the above-described embodiments can be devised by one skilled in the art without departing from the scope of the invention. It is therefore intended that all such variations be included within the scope of the following claims and their equivalents.

What is claimed is:

1. A method for identifying an iris image, the method comprising the steps of:
    obtaining an iris image of an eye;
    generating, from the iris image, an original iris template;
    generating a modified iris template based only on an extracted portion of the iris template, wherein the extracted portion is a row of the iris template;
    comparing the modified iris template with a plurality of previously stored other modified iris templates to select at least one candidate for full template matching; and
    comparing the selected at least one candidate with the original iris template.

2. A method for identifying an iris image, the method comprising the steps of:
    obtaining an iris image of an eye;
    generating, from the iris image, an original iris template;
    generating a modified iris template based only on an extracted portion of the iris template, wherein the extracted portion is a column of the iris template;
    comparing the modified iris template with a plurality of previously stored other modified iris templates to select at least one candidate for full template matching; and
    comparing the selected at least one candidate with the original iris template.

3. A method for identifying an iris image, the method comprising the steps of:
    obtaining an iris image of an eye;
    generating, from the iris image, an original iris template;
    generating a modified iris template based only on an extracted portion of the iris template, wherein the extracted portion of the iris template is a diagonal region;
    comparing the modified iris template with a plurality of previously stored other modified iris templates to select at least one candidate for full template matching; and
    comparing the selected at least one candidate with the original iris template.

* * * * *